(12) United States Patent
Beamish et al.

(10) Patent No.: US 7,526,265 B2
(45) Date of Patent: Apr. 28, 2009

(54) METHOD AND SYSTEM FOR RECEIVER IMPAIRMENT ESTIMATION AND CORRECTION

(75) Inventors: Norman J. Beamish, Costa Mesa, CA (US); William J. Domino, Yorba Linda, CA (US); Morten Damgaard, Laguna Hills, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 417 days.

(21) Appl. No.: 11/137,196

(22) Filed: May 24, 2005

(65) Prior Publication Data

US 2006/0270375 A1    Nov. 30, 2006

(51) Int. Cl.
*H04B 1/10* (2006.01)
(52) U.S. Cl. .................. 455/284; 455/334; 375/346
(58) Field of Classification Search .................. 375/344, 375/345, 346, 285, 348; 455/226.1, 278.1, 455/284, 296, 302–306, 311–334, 280, 283
See application file for complete search history.

(56) References Cited

U.S. PATENT DOCUMENTS

| | | | | |
|---|---|---|---|---|
| 5,937,004 A | * | 8/1999 | Fasulo et al. ................ | 375/224 |
| 6,289,048 B1 | * | 9/2001 | Richards et al. ............. | 375/235 |
| 6,901,121 B1 | | 5/2005 | Dubrovin et al. | |
| 6,977,977 B1 | * | 12/2005 | Dubrovin et al. ............ | 375/346 |
| 7,187,916 B2 | * | 3/2007 | Mo et al. ..................... | 455/323 |
| 7,463,866 B1 | * | 12/2008 | Chen ............................ | 455/91 |
| 2001/0030610 A1 | | 10/2001 | Rochelle et al. | |
| 2002/0071506 A1 | | 6/2002 | Lindquist et al. | |
| 2005/0085237 A1 | | 4/2005 | Yang et al. | |
| 2006/0067437 A1 | * | 3/2006 | Vis et al. ..................... | 375/343 |
| 2006/0079195 A1 | * | 4/2006 | Beamish et al. ............. | 455/313 |
| 2006/0209993 A1 | * | 9/2006 | Lu ............................... | 375/336 |

* cited by examiner

*Primary Examiner*—Nhan T Le

(57) ABSTRACT

Embodiments of a receiver impairment estimation and correction system and method that can be implemented in a low intermediate frequency receiver system are disclosed. In one embodiment, among others, a method for operating a receiver is disclosed that comprises receiving a radio frequency signal, downconverting the radio frequency signal to a downconverted signal comprising an in-phase component and quadrature-phase component, buffering the downconverted signal in a memory, estimating receiver impairments associated with the in-phase component and the quadrature-phase component for a defined time period, and compensating for the receiver impairments for each defined time period.

20 Claims, 7 Drawing Sheets

METHOD AND SYSTEM FOR RECEIVER IMPAIRMENT ESTIMATION AND CORRECTION

BACKGROUND

1. Field of the Invention

This invention relates generally to radio receivers. More particularly, the invention relates to transceiver impairment estimation and correction.

2. Related Art

Simple textbook models of radio receivers typically use homodyne detection. Homodyne detection involves directly demodulating a radio frequency (RF) signal to baseband in a single operation. A receiver that implements homodyne detection is commonly referred to as a direct conversion receiver (DCR). Current state of the art radio receivers for Global System for Mobile Communication/Enhanced Data Rates for GSM Evolution (GSM/EDGE) use DCR systems to obtain cost reductions compared to heterodyne systems. DCR systems have traditionally not been employed in practical applications until recently. This is largely due to problems with direct current (DC) offset. DC offset generally refers to the DC voltage at the output of a system that is unrelated to the signal at the input to the system. An interfering signal (or signals) at the carrier frequency may, after demodulation, cause a DC offset to be added to the desired baseband signal. The interfering signal may include a self-generated interferer component caused by LO self mixing (self-interference from the local oscillator or LO), among other causes. In a DCR system, this interferer component is often manifested as a complex DC offset. In EDGE modulation, for example, any DC offset added to the signal can degrade the performance a of portable transceiver.

More particularly, DC offset can impair received signals, especially at low-signal levels, often resulting in fundamental limitations in EDGE systems in particular and digital communications in general. Solutions to reduce added DC offset often introduce non-linearity at low-signal levels, add additional discrete components (and thus consume more space and power), and may add to the complexity (and cost) of a system. For example, DC offset is often removed in DCR systems by implementing an averaging and subtraction process on a burst by burst basis. A burst is a defined time interval that varies depending on the mode used and/or as configured by a user. For example, in GSM systems, signals arrive in bursts of approximately 577 microseconds in duration. Although this averaging/subtraction process may work for GSM, EDGE presents different challenges. In EDGE, the required signal to noise ratio (SNR) to support the desired channel bit rate is much higher than in GSM, and typically requires more complex techniques to remove DC offset. In a time-division multiple access (TDMA) system such as GSM/EDGE, the phase of an added DC offset may change somewhat randomly from burst to burst, making long term averaging of DC offsets difficult.

A further problem that can arise with DCR systems is in the manufacturing process. In solid state devices a phenomenon known as 1/f noise adds a low frequency noise component to the desired signal. Semiconductor manufacturers attempt to address this problem in DCR chip fabrication by using a process with good 1/f noise characteristics. However, semiconductor fabrication processes with good 1/f noise characteristics are relatively expensive.

To avoid the above described problems associated with a DCR system, it is possible to use a superheterodyne receiver. In a superheterodyne receiver, an RF signal is converted to an intermediate frequency (IF) where DC offset can often be easily removed. Then the IF signal is converted to baseband to provide the desired signal at baseband with substantially no DC offset. Conventional IF-based transceivers use IF frequencies that are many multiples of the desired signal bandwidth to ensure that rejection of image frequencies is adequately high. This approach adds a significant cost to a transceiver as it normally requires expensive filtering components as well as a second set of mixer hardware.

Some radio architectures use a low IF receiver. In this case, the intermediate frequency is chosen to be of the same or of similar value as the bandwidth of the desired signal. This approach allows the received signal to be demodulated in one operation (as in DCR systems) to a low intermediate frequency which can be digitized, and thus the final low IF conversion (which converts the desired signal to baseband) can be carried out in the digital domain. For example, in a GSM system, it is possible to demodulate a received RF signal to a low intermediate frequency before digitizing the signal, and then do the final demodulation in the digital domain. A low IF architecture achieves a similar benefit as DCR systems, including minimal RF hardware while minimizing the effects of DC offset and 1/f noise because such effects are no longer at the center of the desired signal bandwidth. In practice, this can sometimes result in less costly semiconductor processes for low IF systems versus DCR systems.

Some problems common to DCR systems may still exist in low IF receiver systems. For example, a large self-generated interferer component (e.g., caused by LO self mixing) may still be present, manifested as an interferer at the low intermediate frequency. FIG. 1 provides an illustration of an exemplary frequency environment in which interferers can be manifested, and which will assist in understanding the nature of some of the problems that may occur in low IF receiver systems. Shown is a frequency domain plot 100 that may be illustrative of channel slots for a mobile telephone communicating with a base station in a GSM system. The frequency domain plot 100 has an x-axis 102 in units of kilo-Hertz (kHz). For example, frequencies to the right-hand side of the desired signal take on negative frequency values, and frequencies to the left-hand side of the desired signal take on positive frequency values. The sign associated with the frequency axis (positive or negative) is a function of the 90-degree separation in the signal that occurs at a quadrature mixer in a low IF receiver system. As is well known, converting a signal down to baseband involves a multiplication by a complex rotation (e.g., cosine and sine multiplication). If the two signals (cosine and sine) are in perfect quadrature (i.e., exactly 90-degree separation), a demodulation operation results in a positive adjacent and negative adjacent signal in distinct channel slots 104 (i.e. no folding over of positive frequencies onto negative frequencies and vice versa). If the two signals (cosine and sine) are not in perfect quadrature (i.e., non-90-degree separation), then fold over of complementary (opposite in sign) frequencies begins to occur. The greater the deviation from ideal (e.g., 90-degrees), the greater the leakage or fold over from other channels. Along the x-axis 102 are a plurality of channel slots 104 for channels that each have a bandwidth of 200 kHz. For example, shown on each side of the desired signal centered at 100 kHz are $1^{st}$ adjacent channels, $2^{nd}$ adjacent channels, and so forth. In low IF receivers operating in an interference limited environment such as GSM, receiver impairments (e.g., gain imbalance, phase imbalance, etc.) may cause some portion of the energy of adjacent channel interferers (in particular, the energy of the opposite sideband of the $2^{nd}$ adjacent channel since fold over due to RF impairments is symmetric about 0 Hertz (Hz)) to fall directly in the bandwidth of the received signal and thereby degrade receiver performance. A further problem is that typical low IF systems for GSM use a low intermediate frequency of 100 kHz, which may result in a 100 kHz interferer tone added to the desired signal at the radio output. A notch filter can be used to attenuate the energy of this tone without significantly impacting system performance. With EDGE modulation, however, the use of a notch filter to remove the 100 kHz tone may degrade system performance.

Thus, it would be desirable to have a receiver architecture or system that efficiently mitigates or removes interferers and/or DC offset in a low IF system while minimizing cost, size, and power consumption of the receiver, and that performs this processing in real-time on each burst of data.

SUMMARY

Preferred embodiments of a receiver impairment estimation and correction system and method that can be implemented in a low intermediate frequency (IF) receiver system are disclosed. In one embodiment, among others, a method for operating a receiver is disclosed that comprises receiving a radio frequency signal, downconverting the radio frequency signal to a downconverted signal comprising an in-phase component and quadrature-phase component, buffering the downconverted signal in a memory, estimating receiver impairments associated with the in-phase component and the quadrature-phase component for a defined time period, and compensating for the receiver impairments for each defined time period.

Related systems and methods of operation are also provided. Other systems, methods, features, and advantages of the invention will be or become apparent to one with skill in the art upon examination of the following figures and detailed description. It is intended that all such additional systems, methods, and features, and advantages be included within this description and be within the scope of the disclosure.

BRIEF DESCRIPTION OF THE FIGURES

Many aspects of a low intermediate frequency (IF) receiver system and method can be better understood with reference to the following drawings. The components in the drawings are not necessarily to scale, emphasis instead being placed upon clearly illustrating the principles described herein. Moreover, in the drawings, like reference numerals designate corresponding parts throughout the several views.

DETAILED DESCRIPTION

Figure 1:
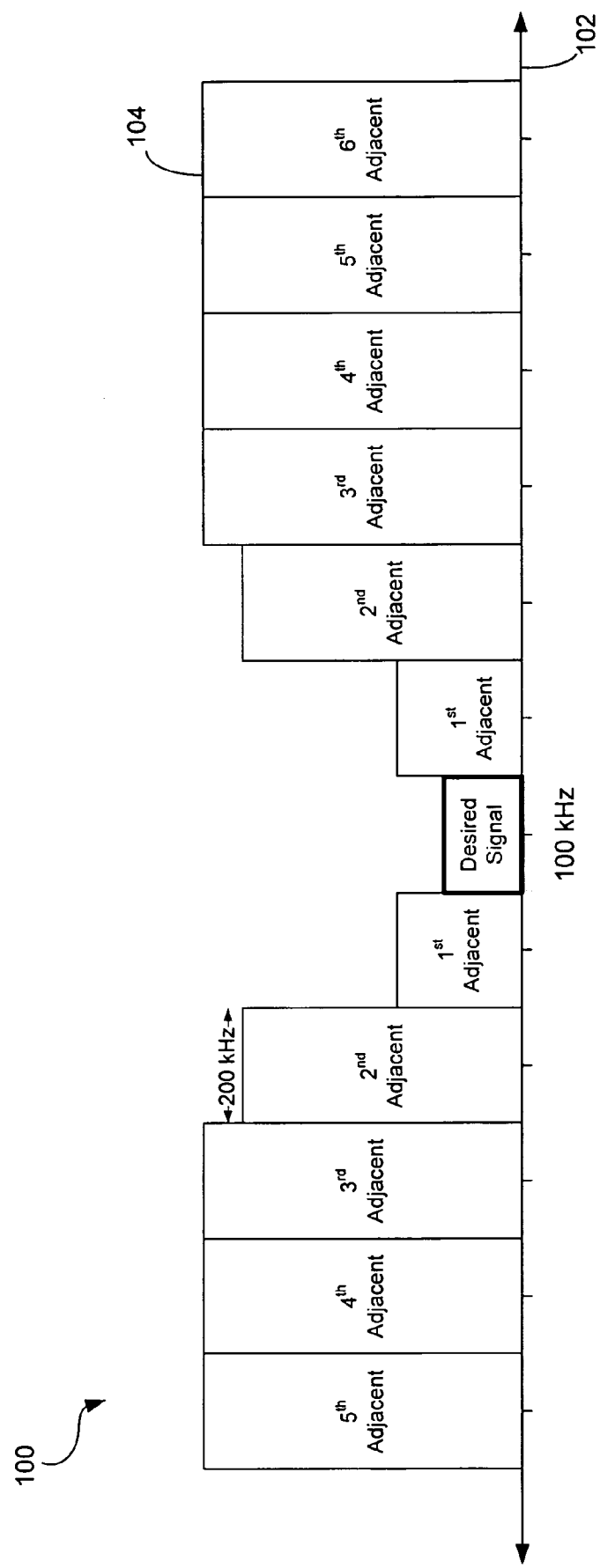
FIG. 1 is a schematic diagram that illustrates an exemplary frequency domain plot of adjacent channels in a communications system.

Embodiments of a receiver impairment estimation and correction system and method implemented in a low intermediate frequency (IF) receiver system are disclosed. In one embodiment, a receiver impairment estimation and correction system mitigates interfering energy from adjacent channels by reducing the level of radio frequency (RF) impairments due to imbalances in gain and/or phase and direct current (DC) offset. The in-band interference energy that is caused by RF impairments is proportional to the product of the RF impairments and the energy associated with one or more adjacent channel interferers. As the energy of an adjacent channel interferer increases, the impairments need to decrease to maintain the same level of in-band interference. A receiver impairment estimation and correction system in a low IF receiver system is disclosed that digitally estimates the impairments and corrects or compensates for these impairments in the digital domain in real-time for each transmission measurement period.

Although a low IF receiver system that estimates and compensates for the RF impairments may reduce the effective level of the RF impairments, some portion of the adjacent channel interferer may still fall into the desired signal bandwidth, which may impact performance of the low IF receiver system if the adjacent channel interferer energy increases. Another low IF receiver system embodiment is disclosed that repositions in frequency an adjacent channel interferer so that the portion of the adjacent channel interferer that is caused to fold over because of RF impairments now falls outside the desired signal bandwidth. In one embodiment, repositioning of the adjacent channel interferer occurs by inverting the sign of the frequency of the low IF offset added to a local oscillator (LO) signal. This sign inversion operation effectively replaces the previous adjacent channel interferer with a new interferer, with a benefit in performance realized when the energy of the new interferer is less than that of the old interferer.

Although described with particular reference to a portable transceiver, embodiments of a receiver impairment estimation and correction system can be implemented in practically any system that receives information modulated on a carrier signal where interfering signals may compromise the integrity of the received information. Also, embodiments of a receiver impairment estimation and correction system make feasible less expensive radio designs that reduce the effect of poor RF performance characteristics by allowing the dynamic compensation of these impairments in the digital domain and in real-time on a burst-by-burst basis. Furthermore, since RF impairments can place a limit on performance (e.g., by distorting the desired signal), embodiments of a receiver impairment estimation and correction system can provide a benefit in systems or implementations where no adjacent channel interferers exist by reducing the level of RF impairments. The description and figures that follow will be used to illustrate an example implementation for embodiments of a receiver impairment estimation and correction system. Embodiments of a receiver impairment estimation and correction system are then described along with related methods. Note that a gain imbalance, as used herein, generally exists when the composite gain of an in-phase (I) channel is not equal to that of a quadrature-phase (Q) channel. A phase imbalance, as used herein, generally exists when the I and Q channels are not separated by exactly 90-degrees of phase. An illustration of gain and phase imbalance will be described below in the context of a low IF receiver system.

Figure 2:
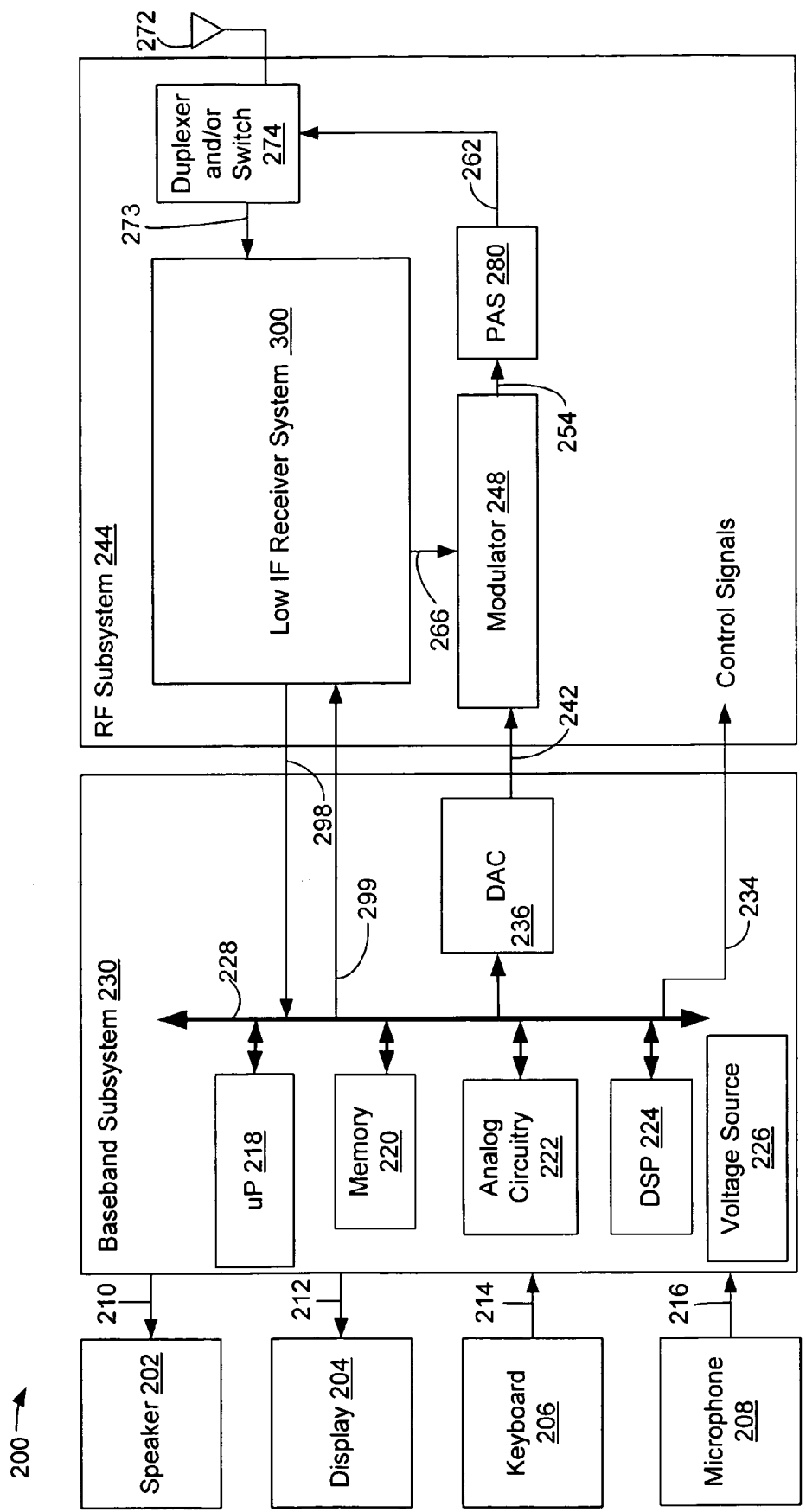
FIG. 2 is a block diagram of an example portable transceiver in which embodiments of a receiver impairment estimation and correction system can be implemented.

FIG. 2 is a block diagram illustrating an example portable transceiver 200 in which various embodiments of a receiver impairment estimation and correction implemented in a low IF receiver system 300 can be implemented. The portable transceiver 200 includes a speaker 202, display 204, keyboard 206, and microphone 208, all connected to a baseband subsystem 230. In a particular embodiment, the portable transceiver 200 can be, for example, a portable telecommunication device such as a mobile/cellular-type telephone. The speaker 202 and display 204 receive signals from the baseband subsystem 230 via connections 210 and 212, respectively. Similarly, the keyboard 206 and microphone 208 supply signals to the baseband subsystem 230 via connections 214 and 216, respectively.

The baseband subsystem 230 includes a microprocessor (μP) 218, memory 220, analog circuitry 222, and a digital signal processor (DSP) 224 in communication via bus 228. The baseband subsystem 230 also includes, in one embodiment, a voltage source 226. Bus 228, although shown as a single bus, may be implemented using multiple busses connected as necessary among the subsystems within the baseband subsystem 230. The microprocessor 218 and memory 220 provide signal timing, processing and storage functions for the portable transceiver 200. Analog circuitry 222 provides analog processing functions for the signals within the baseband subsystem 230. The baseband subsystem 230 provides control signals to the RF subsystem 244 via connection 234, and/or over connection 299 via a serial bus interface (not shown) included within the RF subsystem 244. Although each of connections 234 and connection 299 are shown as a single connection, the control signals may originate from the DSP 224 and/or from the microprocessor 218, and are supplied to a variety of points within the RF subsystem 244. It should be noted that, for brevity, only the basic components of the portable transceiver 200 are illustrated herein.

The baseband subsystem 230 also includes, in one embodiment, a digital-to-analog converter (DAC) 236. The DAC 236 also communicates with the microprocessor 218, memory 220, analog circuitry 222, and/or DSP 224 via bus 228. The DAC 236 converts the digital communication information within the baseband subsystem 230 into an analog signal for transmission to the RF subsystem 244 via connection 242.

The analog signal on connection 242 is modulated and upconverted by a modulator 248, in cooperation with one or more components of the low IF receiver system 300 (via connection 266). In some embodiments, a digital modulator can be located in the RF subsystem 244 wherein the signal from the baseband to the RF subsystem 244 is digital. A modulated signal from the modulator 248 is provided over connection 254. A power amplifier system (PAS) 280 amplifies the modulated signal(s) on connection 254 to the appropriate power level for transmission via connection 262 to a duplexer and/or switch module 274. The transmit signal energy is provided from the duplexer and/or switch module 274 to an antenna 272.

Signals are received at the antenna 272, provided to the duplexer and/or switch module 274, and routed to one of several signal-processing paths of the low IF receiver system 300 via connection 273. It will be appreciated by one having ordinary skill in the art that full-duplex transmit/receive is accomplished, in one implementation, through the use of the duplexer and/or switch module 274 wherein the duplexer and/or switch module 274 includes a duplexer. Alternatively, in another implementation, half-duplex transmit/receive is accomplished through the use of a transceiver duplexer and/or switch module 274 wherein the duplexer and/or switch module 274 includes a switch. The duplexer and/or switch module 274 can also provide band separation, where in one implementation, the duplexer and/or switch module 274 will typically route one set of receive bands to a first receive port (not shown), and a second set of receive bands to a second receive port (not shown). Likewise, the duplexer and/or switch module 274 will typically route one set of transmit bands to a first transmit port (not shown), and a second set of transmit bands to a second transmit port (not shown). In one embodiment, the operation of the duplexer and/or switch module 274 is controlled by a control signal from the baseband subsystem 230 (e.g., via connection 234). In some embodiments, a switch (e.g., controlled from the baseband subsystem 230 via connection 234) can be used to route received signals to the low IF receiver system 300 or transmit signals from connection 262 to the antenna 272.

Signals received by the antenna 272 can, at the appropriate time determined by the baseband subsystem 230, be directed via the duplexer and/or switch module 274 to the low IF receiver system 300 via connection 273. The low IF receiver system 300 includes, in one embodiment, functionality for estimating and compensating for RF impairments in real-time on a per transmit interval basis. Another embodiment of the low IF receiver system 300 includes, in addition to or in lieu of the estimating and compensating functionality, functionality for monitoring energy of the received and processed signal and switching the location of the low intermediate frequency based on detected interferer energy. The low IF receiver system 300 can also include other components used for receiving and processing signals for the various modes and systems, as would be understood by one having ordinary skill in the art in light of the disclosure. Note that in some embodiments, one or more of the disclosed functions of the low IF receiver system 300 can be implemented in the microprocessor 218, or in other components of the portable transceiver 200 including the DSP 224 or memory 220. Further, one or more components of the low IF receiver system 300 can be implemented using hardware, software, and/or a combination of hardware and software. The low IF receiver system 300 provides output signals over connection 298 to the bus 228 for further processing in the digital domain.

Figure 3:
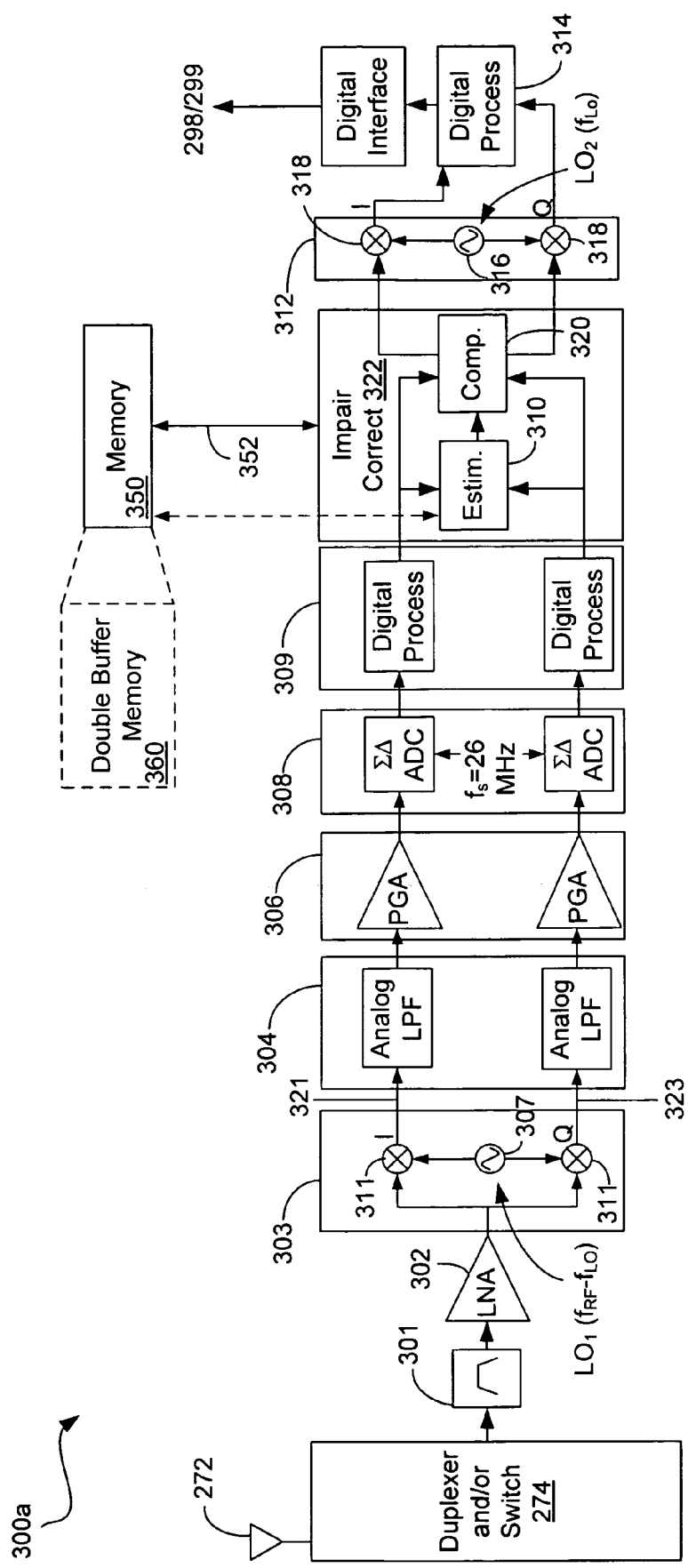
FIG. 3 is a block diagram of an embodiment of a receiver impairment estimation and correction implemented in a low IF receiver system of the portable transceiver shown in FIG. 2.

FIG. 3 is a block diagram of an embodiment of a low IF receiver system 300a implemented in the portable transceiver 200 shown in FIG. 2. The low IF receiver system 300a includes both RF, analog and digital components and is sometimes referred to as a "mixed signal device" or MSD. In one embodiment, a signal received by the antenna 272 will be directed to a receive filter 301, which filters the received signal and supplies the filtered signal to a low noise amplifier LNA 302. The receive filter 301 is a band pass filter, which passes all channels of the particular cellular system in which the portable transceiver 200 is operating. As an example, for a 900 megahertz (MHz) GSM (Global System for Mobile Communication) system, the receive filter 301 passes all frequencies from approximately 925 MHz to 960 MHz, covering 175 channels of 200 kilohertz (kHz) each. One purpose of this filter 301 is to reject all frequencies outside the desired region. The LNA 302 amplifies the signal received from the receive filter 301 to a level at which a downconverter 303 can translate the signal from the transmitted frequency to an intermediate frequency.

The downconverter 303 includes a mixer 311 and a local oscillator (or LO) 307 that generates a local oscillator signal (LO$_1$ signal) having a frequency that is a function of the frequency of the desired RF receive signal and the frequency of the low IF. Folding over due to RF impairments occurs largely at the mixer 311. The LO$_1$ signal is used to downconvert the signal received from the LNA 302. The downconverted signal has a frequency that is centered at an intermediate frequency of 135.417 kHz, versus 100 kHz as used in conventional systems. One benefit (for example, in EDGE systems) of having the intermediate frequency at 135.417 kHz is that signal degradation that occurs when attempting to remove DC offset is mitigated or avoided altogether since DC offset is out-of band when an intermediate frequency of 135.417 kHz is implemented, as opposed to being in-band when 100 kHz is the intermediate frequency. Additional benefits of operating at an intermediate frequency of 135.417 kHz will be described below.

The IF signals output from the downconverter 303 include an in-phase (I) signal on connection 321 and a quadrature-phase (Q) signal on connection 323. These signals are provided to a low-pass filter 304, which provides adjacent channel rejection and anti-aliasing functionality. The anti-aliasing functionality attenuates signals that lie outside the fundamental Nyquist band. A gain imbalance exists when the composite gain (e.g., from the mixer 311 of downconverter 303 to baseband) of the I channel (i.e., the I signal on connection 321) is not equal to that of the Q channel (i.e., the Q signal on connection 323). A phase imbalance exists when there is not exactly 90-degrees phase separation between the I and Q channels. The adjacent channel rejection and anti-aliasing functionality ensures that a downstream sigma-delta analog-to-digital converter (ADC) 308 will not saturate or overload when large interferers are present. The resulting filtered signals output from the low-pass filter 304 are amplified by a programmable gain amplifier (PGA) 306. The PGA 306 amplifies the filtered signal and supplies the amplified signal to the sigma-delta ADC 308.

The sigma-delta ADC 308 preferably provides a wide enough bandwidth (i.e., it operates using a high enough sample rate) whereby aliased images of adjacent channel interferers are sufficiently attenuated before they fold back into the desired band when the signal is downsampled. In some embodiments, the sigma-delta ADC 308 may incorporate automatic saturation detection functionality. In one embodiment, the sigma-delta ADC 308 samples the signal at 26 MHz to ensure that adjacent channel interferers do not alias into the desired signal band, while minimizing the performance requirements of the analog LPF 304. The resulting digital signals are provided to a digital processing block 309.

The digital processing block 309 may include integrating functionality to provide further attenuation of adjacent channel interferers. For example, the use of a higher order integrator (e.g., $4^{th}$ order) may be used for greater interferer rejection. The digital processing block 309 may also include functionality for differentiation, downsampling, anti-droop (e.g., equalization and compensation to reduce the asymmetry of the amplitude response across the desired signal bandwidth), and DC removal (e.g., implemented using a notch filter), among other processing components as would be understood in the context of this disclosure by one having ordinary skill in the art. In one embodiment, the sample rate of the downsampled signal is approximately 1.08 MHz or $\frac{1}{24}^{th}$ of the ADC sampling frequency.

The signal is provided from the digital processing block 309 to an impairment correction module 322. The impairment correction module 322 can be implemented in software, hardware, or a combination of software and hardware. In one embodiment, the functionality of portions of the impairment correction module 322 are performed in conjunction with one or more memory elements that are accessible to the impairment correction module 322 via, for example, one or more high speed internal busses. The impairment correction module 322 includes an estimator module 310 and a compensator module 320. While shown as residing within the impairment correction module 322, the functionality provided by the estimator module 310 and the compensator module 320 may be performed in conjunction with other components of the portable transceiver 200. The estimator module 310 operates on the I and Q signals together as the estimator module 310 is attempting to determine the relationship between the I and Q statistics of the received signal. The compensator module 320 receives the data generated by the estimator module 310 and applies the estimate data to the I and Q signals to compensate for receiver impairments. Since the I and Q signals are complex signals, the compensation is thus implemented as a complex operation applied to the complex signals.

In one embodiment, the estimator module 310 estimates impairments by monitoring the signal at one burst, and then implementing a correction or compensation at the compensator module 320 in the same burst. In this manner, a real-time receiver impairment estimation and correction can be applied to the received data. Such a real-time receiver impairment correction is particularly useful in transmission systems that rapidly change from transmit interval to transmit interval. For example, such an estimation and correction system is useful in frequency hopping communication systems where channel parameters are likely to change from burst to burst. An example is a frequency hopping communication scheme in which one burst is located at the upper portion of the GSM frequency plan with a following burst of data occurring at the lower frequency portion of the GSM frequency plan. The ability to estimate and compensate for receiver impairments on each burst makes systems that use frequency hopping and that employ the methodology described herein significantly more robust than communication schemes that use estimation and compensation methodologies that estimate receiver impairments on one burst and apply the correction to a subsequent burst.

In practice, the estimator module 310 communicates over high speed internal data bus 352 with a memory element 350 to buffer the receive data for a particular transmit time interval, or burst, at the same speed or faster than the speed at which the data is being processed. The data bus 352 operates at least at the speed that the data is traveling through the low IF receiver system 300a and preferably, in this embodiment, at least at 1.08 MHz. The estimator module 310 estimates parameters of the signal to monitor for impairments such as DC offset, gain imbalance and phase imbalance. The complexity of this task depends, at least in part, on the stability of the DC offset and the gain and phase imbalance over frequency and time. If the DC offset and the gain and phase imbalance vary significantly from channel to channel, it may be desirable to track the DC offset and the gain and phase imbalance separately for each channel. If the imbalances vary significantly over a short period of time (e.g., less than 5-10 seconds), then multiple burst averaging may have to be confined to shorter periods. Changes in temperature may also be considered in estimation and compensation, as well as other variations that may occur over time. In some embodiments, non-volatile random access memory (NVRAM) (not shown) may be used to store information about the DC offset and the gain and phase imbalance characteristics of the transceiver.

In accordance with this embodiment, the receive data for each transmit interval is buffered in the memory 350 while the estimator module 310 calculates the receiver impairments for the data associated with that burst. The connection between the estimator module 310 and the memory 350 is also shown using a dotted line to indicate the interaction between these elements during the receiver impairment estimation. The speed of the internal data bus 352 allows the data to be buffered and the receiver impairments calculated on a near real-time basis and the receiver impairment estimate to be delivered to the compensation module 320 so that a compensation factor can be applied to the same data in the same transmit interval that was used to compute the impairment estimation.

In another embodiment, the memory 350 can be configured in what is referred to as a "double buffer" configuration to allow the near real-time estimation and correction of received data in communication systems that may not employ a "burst" type communication methodology. Using such a double buffer memory 360 arrangement allows the impairment correction module 322 to estimate and compensate for receiver impairments over a continuous stream of data.

Once the nature of the impairments has been determined, the estimator module 310 delivers the DC offset and the gain and phase imbalance estimates to the analog and/or digital compensators (not shown) of the compensator module 320. Analog and digital compensators are well known in the art and thus discussion of the compensators is omitted. The compensator module 320 compensates for the impairments on the same burst that was used to determine the receiver impairments. In some applications, impairments remain fairly constant from burst to burst since the impairments are directly related to the characteristics of the associated receiver system. However, in other communication systems, impairments can vary significantly from burst to burst, making it desirable to have the capability to estimate the receiver impairments and compensate those impairments on the same data that was used to generate the estimate.

Figure 4:
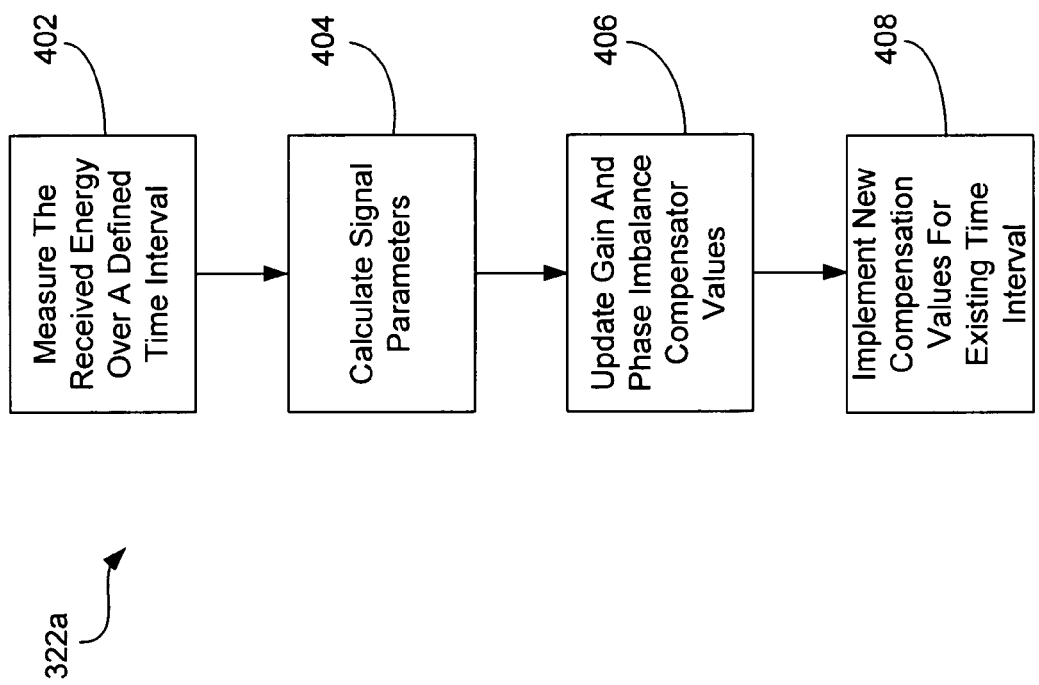
FIG. 4 is a flow diagram of an embodiment of an impairment correction method employed by components of the low IF receiver system shown in FIG. 3.

FIG. 4 is a flow diagram of an embodiment of an estimation and compensation method 322a employed by the impairment correction module 322. Block 402 includes measuring the received energy over a defined time interval. For example, the time interval may be over one burst comprising N sample intervals, and the energy can be determined as follows:

$$E_{IQ} = \Sigma((I_n)(Q_n)), \quad \text{Eq. 1}$$

$$E_I = \Sigma((I_n)(I_n)), \text{ and} \quad \text{Eq. 2}$$

$$E_Q = \Sigma((Q_n)(Q_n)), \text{ where n is an integer value from 1 to } N. \quad \text{Eq. 3}$$

$I_n$ and $Q_n$ represent the data samples in the respective I and Q signal paths. Block 404 includes calculating signal parameters. Exemplary signal parameters include the ratio of signal energy between the I and Q signals ($\alpha$), the ratio of the cross product of the IQ signal over the Q signal ($\theta$), an estimate of the phase imbalance ($\phi$), and an estimate of the gain imbalance ($\gamma$). The determination of these parameters can be made by implementing the following equations:

$$\alpha = E_I/E_Q, \quad \text{Eq. 4}$$

$$\theta = E_{IQ}/E_Q, \quad \text{Eq. 5}$$

$$\phi = \arctan(-\theta), \quad \text{Eq. 6}$$

$$\gamma = SQRT[(1+\theta^2)/(\alpha-\theta^2)]; SQRT \text{ is a square root function.} \quad \text{Eq. 7}$$

The compensator module 320 (FIG. 3) may also contain DC offset correction circuitry which can estimate the mean of the received burst and subtract it from the received signal, to provide DC offset correction. Block 406 includes updating values corresponding to a gain imbalance compensator and a phase imbalance compensator (both not shown) of the compensator module 320. For example, the gain imbalance compensator value may be updated by subtracting $\gamma$ from the current compensation value. Similarly, the phase imbalance compensator value may be updated by subtracting $\phi$ from the current compensation value. Block 408 includes implementing the new compensation values on the same burst that was used to develop the impairment estimate.

Joint estimation of the gain and phase imbalance can be carried out in the digital domain after the signal has been downsampled. Some of these calculations can be carried out directly on the low precision ADC output. In one implementation, this estimate may converge to less than 0.1 decibel (dB) residual gain imbalance and 0.5 degrees phase imbalance within approximately 10 bursts or less.

The estimator and compensator modules 310 and 320, respectively, of the impairment correction module 322 enable the reduction in the use of analog components, enabling the low IF receiver system 300a to be implemented on-chip using a simple process, such as complementary metal-oxide semiconductor (CMOS) technology, as well as improving repeatability in performance due to the largely digital domain processing.

Note that in some embodiments, several of the functions described above for the impairment correction module 322 can be implemented using approximations. For example, the arctan function and the SQRT function may be approximated by using simpler functions (e.g., arctan $(x) \sim x$). As another example, the squaring function used in calculating $E_I$ and/or $E_Q$ might be implemented using a read-only memory (ROM) table. Another example includes removing the $\theta$ term in the calculation of the gain imbalance, among other simplifications.

Variations to the method 322a described above may also be employed. For example, the gain and/or phase imbalance of the low IF receiver system 300a may be calibrated at different RF operating frequencies. The calibration information can be stored in memory (not shown), enabling default values for initiating the compensation algorithms of the compensator module 320 when the low IF receiver system 300a switches to these operating frequencies rather than starting from scratch each time switching occurs. Such an implementation may be desired if there are significant variations of RF imbalances over the frequency range of operation.

Referring again to FIG. 3, the signal from the impairment correction module 322 is provided to a digital demodulator 312. The digital demodulator 312 implements digital domain demodulation. The digital demodulator 312 includes a local oscillator 316 and a mixer 318. The mixer 318 mixes the IF signal with an $LO_2$ signal generated by the local oscillator 316 to translate the center frequency of the IF signal from 135.417 kHz to 0 Hz, thus enabling the signal to pass to the baseband subsystem 230 (FIG. 2) for further processing.

Note that one benefit of using 135.417 kHz as the intermediate frequency (e.g., as opposed to 100 kHz prevalent in conventional systems) is that 135.417 kHz is exactly $\frac{1}{8}^{th}$ of the frequency of the downsampled signal in the digital processor block 309 (i.e., (26 MHz/24)/8=135.417 kHz). In other words, the low intermediate frequency of 135.417 kHz is an integer divisor of the sampling rate of the input signal to the mixer 318, as shown in equation 8:

$$f_s = 1.083333 \text{ MHz, low } IF = f_s/8, (135.417 \text{ kHz}); \quad \text{Eq. 8}$$

Further, for GSM/EDGE systems, 135.417 kHz is one-half the GSM/EDGE symbol rate. Thus, using 135.417 kHz as the intermediate frequency simplifies the digital demodulation hardware.

The translation from 135.417 kHz to baseband is a reordering of the complex signal accompanied by a scaling multiplier and two additions for every second input sample, due relationship between the symbol rate and the low intermediate frequency. Thus, the values the $LO_2$ signal takes are a repeating complex sequence, which are multiplied with the incoming signal (from impairment correction module 322). Table 1 shows exemplary values the $LO_2$ signal will take and the output generated with an input signal (I,Q).

TABLE 1

| Sample Number (modulo 8) | Low IF | Output | scaling |
|---|---|---|---|
| 0 | 1 | $I + j \cdot Q$ | 1 |
| 1 | $1 + j$ | $(I - Q) + j \cdot (I + Q)$ | $1/\sqrt{2}$ |
| 2 | $j$ | $-Q + j \cdot I$ | 1 |
| 3 | $-1 + j$ | $-(I + Q) + j \cdot (I - Q)$ | $1/\sqrt{2}$ |
| 4 | $-1$ | $-I - j \cdot Q$ | 1 |
| 5 | $-1 - j$ | $(Q - I) - j \cdot (I + Q)$ | $1/\sqrt{2}$ |
| 6 | $-j$ | $Q - j \cdot I$ | 1 |
| 7 | $1 - j$ | $(I + Q) + j \cdot (Q - I)$ | $1/\sqrt{2}$ |

Another benefit of using 135.417 kHz as the low intermediate frequency is that it enables the low IF receiver system ADC bandwidth (e.g., of sigma-delta ADC 308) to be wider than a comparable direct conversion receiver (DCR) system. The wider bandwidth allows for the possibility of running the radio in either the DCR mode or the low IF mode.

The intermediate frequency of 135.417 kHz is one-eighth of the sampling frequency used to sample the signal at the input to the low IF mixer, which enables use of an eight-element complex table (Table 1) to implement the low IF mixer. In some embodiments, the use of a low IF that is one-fourth of the sampling frequency enables the use of a four-element real table (table not shown, but based on equations 10 and 11 discussed below). Thus, a low intermediate frequency of 135.417 kHz based on one-eighth of the sampling frequency used to sample the signal at the input to the low IF mixer may be used, or some other frequency which is an integer divisor of the sampling frequency of the down-sampled signal may be used.

The I and Q output signals of the digital demodulator 312 are provided to a digital processing module 314. The digital processing module 314 includes functionality to remove out-of-band energy and further sampling functionality to reduce complexity by downsampling the receive signal to a reduced sampling rate, thus reducing the rate at which processing operations are performed. For example, the digital processing module 314 may include a $4^{th}$ order infinite impulse response (IIR) low-pass filter (not shown) to attenuate the remaining adjacent channel interferers which lie within the fundamental Nyquist bandwidth (e.g., $2^{nd}$ adjacent interferers). The digital processing module 314 may also include a downsampler (not shown), as indicated above. The downsampler lowers the sampling frequency (e.g., to 541.7 kHz) to reduce computational complexity. The digital processing module 314 may also include a finite impulse response (FIR) low-pass filter (not shown) to remove any low frequency interference tones and provide close in-channel filtering, as well as to compensate for droop. A FIR low-pass filter can attenuate the low IF tone at 135.417 kHz at the same time as implementing the required channel filtering. A FIR low-pass filter may be designed with a null in the appropriate place of its amplitude response to assist in the removal of any remaining energy due to DC offset. A FIR low-pass filter may be programmable in some embodiments.

Figure 5A:
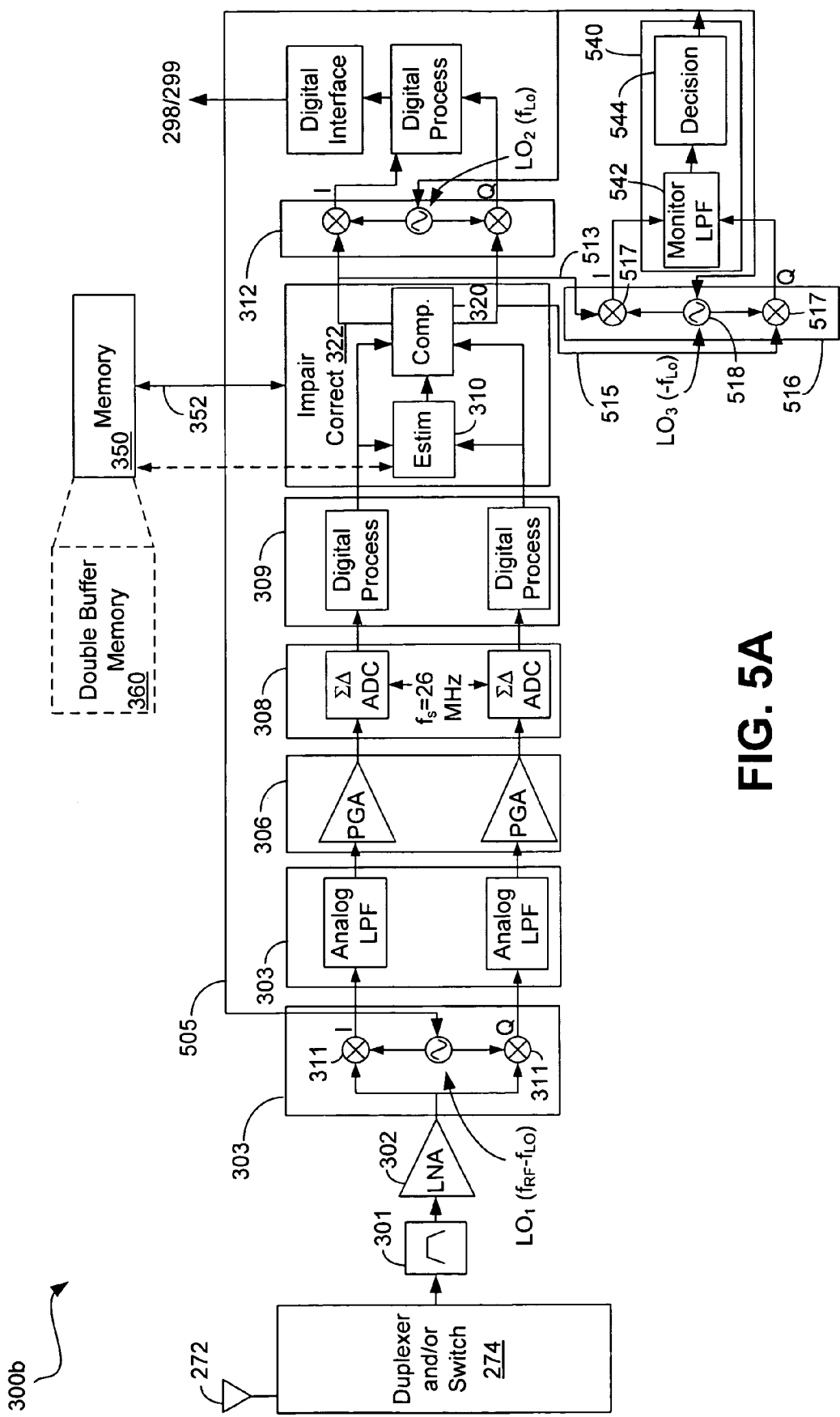
FIG. 5A is a block diagram of another embodiment of a receiver impairment estimation and correction system implemented in the low IF receiver system of the portable transceiver shown in FIG. 2.
Figure 5B:
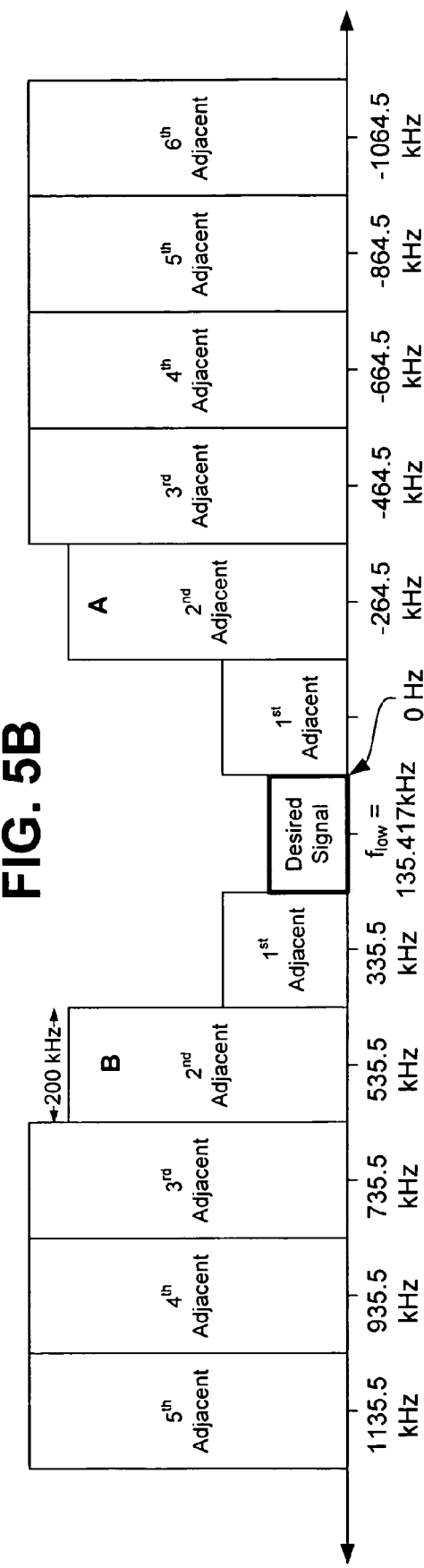
FIGS. 5B-5C are frequency domain plots of adjacent channels in a communications system used to illustrate a low IF centered at 135.417 kHz with adjacent interferers, signal A and signal B, and to illustrate switching as implemented by components of the low IF receiver system shown in FIG. 5A.
Figure 5C:
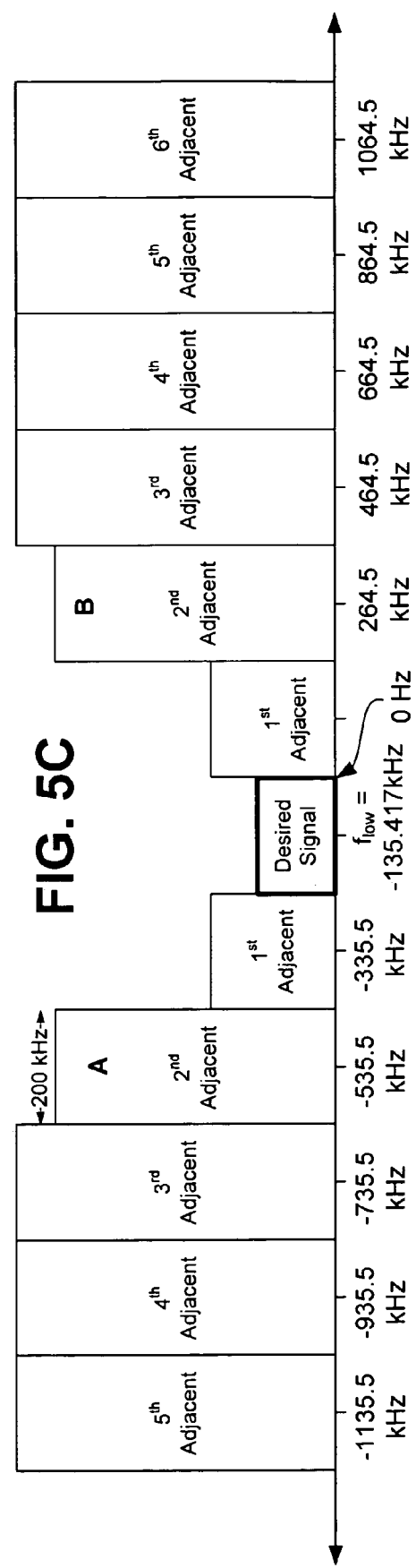

FIG. 5A is a block diagram of another embodiment of a low intermediate frequency (IF) receiver system 300b of the portable transceiver 200 shown in FIG. 2. The low IF receiver system 300b includes functionality for determining whether the energy of an interferer currently occupying an opposite sideband has a signal energy that is above a preset threshold, and then switches the low intermediate frequency accordingly, as is described below and illustrated in FIGS. 5B-5C. FIG. 5B shows a frequency domain plot of adjacent channels in a communications system, similar to the plot shown in FIG. 1, but modified to illustrate the IF frequency centered at 135.417 kHz with adjacent interferers, signal A and signal B. The opposite sideband signal is a 2nd adjacent interferer which folds into a desired signal band. For example, and referring to FIG. 5B, assume a desired signal band centered at a low intermediate frequency, or $f_{low}$. The $2^{nd}$ adjacent interferers occur below the desired signal band in frequency (e.g., signal A, as shown) and above the desired signal band in frequency (e.g., signal B, as shown). The fold over due to RF impairments occurs symmetrically about 0 Hz. The low IF receiver system 300b monitors the $2^{nd}$ adjacent interferer which occupies the opposite sideband, for example signal A. If the energy of signal A is greater than a preset threshold (which may be programmable), then the low IF receiver system 300b, in one embodiment, changes the sign of the frequency of the low IF signal. The effect of this sign change is the "swapping" of the $2^{nd}$ adjacent interferers, that is the swapping of signal A and signal B relative to the desired signal band, as shown in FIG. 5B. Thus, the opposite sideband is now occupied by the other $2^{nd}$ adjacent interferer (i.e., signal B). The signal A does not fold over into the desired signal band, and thus is removed by the analog filters. If the signal B is lower in energy than signal A, then an improvement in performance is realized. The process continues, whereby the energy of signal B is compared to a preset threshold. If the energy of signal B is above a preset threshold, then the low IF receiver system 300b changes the sign of the frequency of the low IF signal and the process continues in like manner. In some embodiments, switching may be delayed by a fixed or adjustable time interval in instances where two strong adjacent interferers may otherwise cause a "ping-pong" effect via the low IF switching.

Referring to FIG. 5A, the low IF receiver system 300b includes components of the low IF receiver system 300a shown and described in association with FIGS. 3 and 4, and thus the discussion of the same is omitted. The low IF receiver system 300b also includes a downconverter 516, which includes a mixer 517 and a local oscillator 518. The mixer 517 receives the I and Q signals from the impairment correction module 322 over connections 513 and 515, respectively. The local oscillator 518 generates a local oscillator signal $LO_3$, which is an integer divisor of the sampling rate of the input signal. In other words, $$f_s = 1.083333 \text{ MHz, monitor } IF = -f_s/4(-270.833 \text{ kHz}). \qquad \text{Eq. 9}$$

The values that the $LO_3$ signal takes are a repeated complex sequence multiplied at the mixer 517 with the incoming signal (from impairment correction module 322), as illustrated in Eq. 10 and 11:

$$\cos(2 \times \pi \times n \times \text{monitor } IF/f_s) \text{ where } n=0 \ldots 3 ==> (1,0,-1,0) \qquad \text{Eq. 10}$$

$$\sin(2 \times \pi \times n \times \text{monitor } IF/f_s) \text{ where } n=0 \ldots 3 ==> (0,-1,0,1). \qquad \text{Eq. 11}$$

Figure 6:
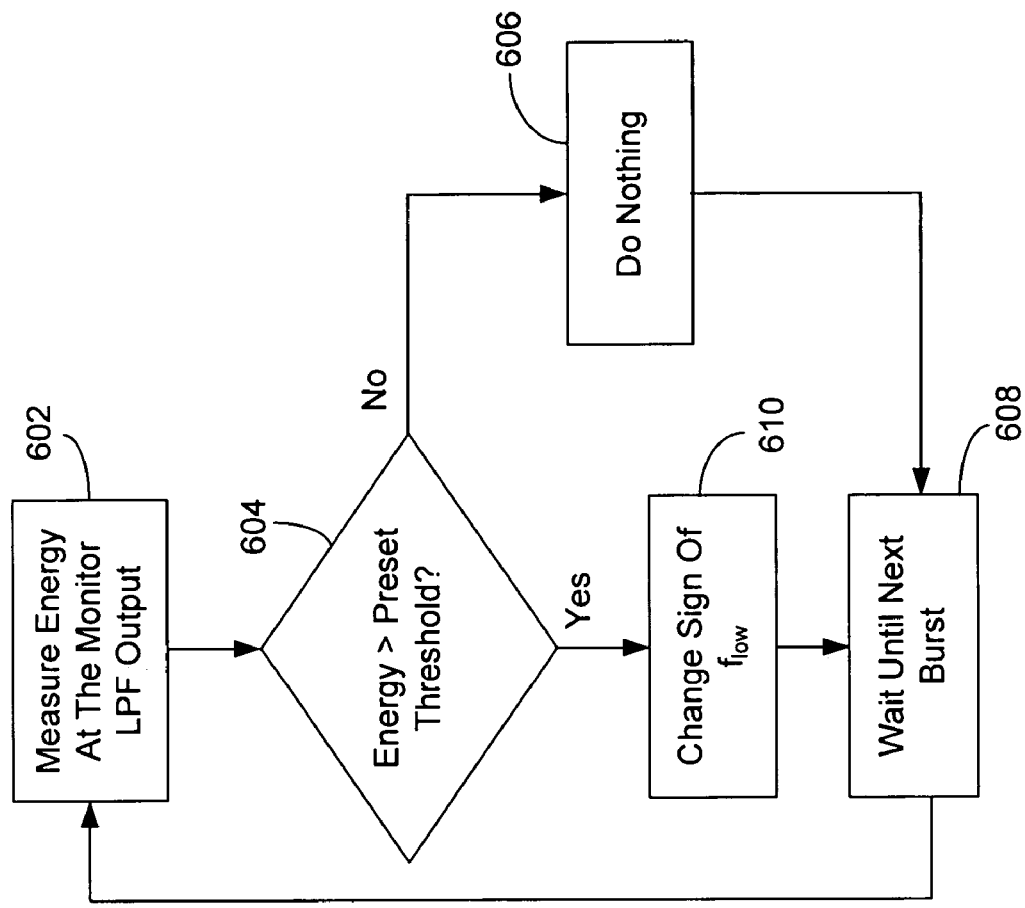
FIG. 6 is a flow diagram of an embodiment of a frequency switching method employed by components of the low IF receiver system shown in FIG. 5A.

The LO$_3$ signal is used to convert the opposite sideband from approximately −270.833 kHz to 0 Hz to enable the application of a monitor low-pass filter (LPF) 542 of a switching module 540 to isolate the signal energy in an opposite sideband. The downconverter 516 provides I and Q signals to the switching module 540. The switching module 540 can be implemented in software, hardware, or a combination of software and hardware. The monitor LPF 542 of the switching module 540 isolates the opposite sideband signal energy of the I and Q signals. The switching module 540 includes, in addition to the monitor LPF 542, a decision module 544. With continued reference to FIG. 5A, the flow diagram in FIG. 6 will be used to illustrate an embodiment of a switching module method 540a. In block 602, the decision module 544 measures the opposite sideband energy at the output of the monitor LPF 542. In block 604, the decision module 544 determines whether the opposite sideband signal energy has exceeded a preset threshold. If a preset threshold has not been exceeded, then no switching operation is performed (block 606) and the switching module 540 wait for the next burst (block 608). When the next burst occurs, the process repeats at block 602. If a preset threshold has been exceeded, block 610 includes changing the sign of the low intermediate frequency, $f_{low}$.

The decision module 544 responsively switches the sign of the frequency of the low intermediate frequency signal, resulting in a frequency translation of $2 \times f_{low}$. One effect of this operation is that the low IF receiver system response seen by the high-side interferer will be the same as was previously seen by the low-side interferer. Similarly, the low IF receiver system response now seen by the low-side interferer will be the same as that previously seen by the high-side interferer.

In some embodiments, functionality of the monitor LPF 542 can be implemented on either the I or Q signal and a decision can be made based on the derived information from one of the signals.

In practice, the switching of the low intermediate frequency may be accomplished by the switching module 540 (FIG. 5A) providing an offset to the mixer 311 (of downconverter 303, FIG. 5A) of approximately 270.833 kHz ($2 \times f_{low}$) and inverting the sign of the amplitude of the Q portion of the complex input of signals LO$_2$ and LO$_3$ of downconverters 312 and 516, respectively.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

While various embodiments of the invention have been described, it will be apparent to those of ordinary skill in the art that many more embodiments and implementations are possible that are within the scope of this invention. Accordingly, the invention is not to be restricted except in light of the following claims and their equivalents.

What is claimed is:

1. A method for operating a receiver, comprising:
   receiving a radio frequency signal;
   downconverting the radio frequency signal to a downconverted signal comprising an in-phase component and quadrature-phase component;
   buffering an interval of the downconverted signal in a memory, the buffered interval of the downconverted signal representing information for a defined time period carried in the radio frequency signal, a plurality of said intervals of the downconverted signal being successively buffered in the memory;
   estimating receiver impairments associated with the in-phase component and the quadrature-phase component for the defined time period using the interval of the downconverted signal; and
   compensating for the receiver impairments for each defined time period by inversely applying the estimated receiver impairments for the defined time period to the buffered interval of the downconverted signal.

2. The method of claim 1, wherein the estimating occurs over a first time interval corresponding to sampling the in-phase component and the quadrature-phase component.

3. The method of claim 2, further including reducing a gain and phase imbalance for an in-phase component and a quadrature-phase component corresponding to a sampling operation occurring during the first time interval based on the estimate of the gain and phase imbalance performed during the first time interval.

4. The method of claim 3, wherein the first time interval corresponds to a communication burst.

5. The method of claim 1, further including reducing the gain and phase imbalance for the in-phase component and the quadrature-phase component based on the estimate of the gain and phase imbalance.

6. The method of claim 1, wherein the estimating includes estimating at least one of energy of the in-phase component, energy of the quadrature-phase component, and a cross product of energy of the in-phase component and energy of the quadrature-phase component.

7. The method of claim 1, wherein estimating and compensating includes estimating and compensating in a digital domain using a double buffer memory arrangement, wherein successive intervals of the downconverted signal are alternately buffered in corresponding dual buffers, with the estimated receiver impairments for the defined time period being applied to one interval of the downconverted signal stored in one buffer while a next interval of the downconverted signal is being buffered in another buffer.

8. The method of claim 1, wherein the downconverted signal comprises a low intermediate frequency centered at a frequency that is an integer divisor of a sampling frequency of the downconverted signal.

9. A radio frequency receiver device, comprising:
   a low intermediate frequency receiver system that receives a radio frequency signal and downconverts the radio frequency signal to a downconverted signal, the downconverted signal including an in-phase component and quadrature-phase component, the low intermediate frequency receiver system further including:
   a memory configured to buffer an interval of the downconverted signal, the buffered interval of the downconverted signal representing information for a defined time period carried in the radio frequency signal, a plurality of said intervals of the downconverted signal being successively buffered in the memory; and
   an impairment correction module configured to estimate receiver impairments associated with the in-phase component and the quadrature-phase component for a defined time period and compensate for the receiver impairments for each defined time period using the interval of the downconverted signal, the impairment correction module compensating for the receiver impairments by inversely applying the estimated receiver impairments for the defined time period to the buffered interval of the downconverted signal.

10. The device of claim 9, wherein the impairment correction module includes an estimator module configured to estimate gain and phase imbalance during a first time interval.

11. The device of claim 10, wherein the impairment correction module includes a compensator module configured to reduce a gain and phase imbalance for an in-phase component and a quadrature-phase component sampled during the first time interval based on the estimate of the gain and phase imbalance performed during the first time interval.

12. The device of claim 10, wherein the estimator module is configured to estimate at least one of energy of the in-phase component, energy of the quadrature-phase component, and a cross product of energy of the in-phase component and energy of the quadrature-phase component.

13. The device of claim 10, further including:
a downconverter coupled to the impairment correction module, wherein the downconverter is configured to multiply a signal received from the impairment correction module with a local oscillator signal to provide a downconverted signal; and
a switching module configured to receive the downconverted signal, measure the energy of an adjacent channel interferer of the downconverted signal, and reposition in frequency the adjacent channel interferer when the adjacent channel interferer energy exceeds a preset threshold.

14. The device of claim 9, wherein the impairment correction module includes a compensator module configured to reduce the gain and phase imbalance for the in-phase component and the quadrature component based on the estimate of the gain and phase imbalance.

15. The device of claim 14, further including:
a downconverter coupled to the impairment correction module, wherein the downconverter is configured to multiply a signal received from the impairment correction module with a local oscillator signal to provide a downconverted signal; and
a switching module configured to receive the downconverted signal, measure the energy of an adjacent channel interferer of the downconverted signal, and reposition in frequency the adjacent channel interferer when the adjacent channel interferer energy exceeds a preset threshold.

16. The device of claim 9, wherein the impairment correction module is configured in at least one of software and hardware.

17. The device of claim 9, wherein the impairment correction module operates in a digital domain.

18. The device of claim 9, wherein the impairment correction module is configured in a computer-readable medium.

19. The device of claim 9, wherein the downconverted signal comprises a low intermediate frequency centered at a frequency that is an integer divisor of a sampling frequency of the downconverted signal.

20. A method for operating a receiver, comprising:
receiving a radio frequency signal;
downconverting the radio frequency signal to a downconverted signal comprising an in-phase component and quadrature-phase component;
buffering an interval of the downconverted signal in a memory, the buffered interval of the downconverted signal representing information for a defined time period carried in the radio frequency signal, a plurality of said intervals of the downconverted signal being successively buffered in the memory;
determining an energy estimate $E_I=\Sigma((I_n)(I_n))$ of the in-phase component $(I_n)$ and an energy estimate $E_Q=\Sigma((Q_n)(Q_n))$ of the quadrature-phase component $(Q_n)$ over an estimation period less than or equal to the defined time period, where n is an integer value ranging from 1 to a number of samples in the estimation period;
determining a cross product estimate $E_{IQ}=\Sigma((I_n)(Q_n))$ of the in-phase component and the quadrature-phase component over an estimation period less than or equal to the defined time period of the signal, where n is an integer value ranging from 1 to a number of samples in the estimation period;
estimating a gain imbalance over the defined time period as $SQRT[(1+(E_{IQ}/E_Q)^2)/(E_I/E_Q-(E_{IQ}/E_Q)^2)]$;
estimating a phase imbalance over the defined time period as $ARCTAN(-E_{IQ}/E_Q)$;
compensating for the gain imbalance and phase imbalance of the signal for the defined time period by inversely applying the gain imbalance and the phase imbalance to the interval of the downconverted signal buffered in the memory to form a compensated signal in the memory; and
reading the compensated signal out of the memory.

* * * * *